United States Patent
Marubayashi et al.

(10) Patent No.: US 7,687,188 B2
(45) Date of Patent: Mar. 30, 2010

(54) SEALED CELL HAVING NON-RESEALABLE SAFETY VALVE

(75) Inventors: Hironori Marubayashi, Sumoto (JP); Takuma Morishita, Sumoto (JP); Satoshi Yoshida, Sumoto (JP); Ryo Kashimura, Tokushima (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 1042 days.

(21) Appl. No.: 10/974,748

(22) Filed: Oct. 28, 2004

(65) Prior Publication Data

US 2005/0112455 A1 May 26, 2005

(30) Foreign Application Priority Data

Oct. 31, 2003 (JP) .............................. 2003-373604

(51) Int. Cl.
*H01M 2/12* (2006.01)
*H01M 2/10* (2006.01)

(52) U.S. Cl. .............................. 429/53; 429/56; 429/82; 429/96

(58) Field of Classification Search ............. 429/53–56, 429/46; 137/68.25, 68.27; 220/89.2
See application file for complete search history.

(56) References Cited

U.S. PATENT DOCUMENTS

| | | | |
|---|---|---|---|
| 4,943,497 A * | 7/1990 | Oishi et al. .................... | 429/53 |
| 5,609,972 A | 3/1997 | Kaschmitter et al. | |
| 6,207,319 B1 | 3/2001 | Nam | |
| 6,265,097 B1 * | 7/2001 | Konno et al. .................. | 429/56 |
| 6,571,816 B2 | 6/2003 | Morishita et al. | |
| 6,589,687 B1 | 7/2003 | Konno et al. | |

(Continued)

FOREIGN PATENT DOCUMENTS

EP 0 895 297 A1 2/1999

(Continued)

OTHER PUBLICATIONS

Chinese Office Action dated Nov. 30, 2007, issued in corresponding Chinese Patent Application No. 200410086597.2.

(Continued)

*Primary Examiner*—Dah-Wei D Yuan
*Assistant Examiner*—Adam A Arciero
(74) *Attorney, Agent, or Firm*—Westerman, Hattori, Daniels & Adrian, LLP

(57) ABSTRACT

A sealed cell having a safety mechanism is provided. The safety mechanism has a non-resealable valve structure formed in a sealing plate that seals the cell. The valve structure is broken as soon as the internal pressure reaches or exceeds a predetermined value so as to permit the internal gas to be released outside. The valve structure has at least one dome protruding toward the interior of the cell, which in turn has at the periphery thereof a break groove for facilitating the breakage of the valve structure. This makes the valve structure highly responsive to the internal pressure and causes to form a break-opened orifice of a sufficient area at the time of operation in response to the increased internal pressure. The valve structure is not unnecessarily broken by the impacts of, for example, dropping. As a result, the safety of the sealed cell is significantly improved.

6 Claims, 7 Drawing Sheets

U.S. PATENT DOCUMENTS

| | | | |
|---|---|---|---|
| 6,649,301 B1 * | 11/2003 | Oh et al. ................... 429/56 |
| 7,140,380 B2 | 11/2006 | Marubayashi et al. |
| 2001/0027807 A1 * | 10/2001 | Morishita et al. ........ 137/68.27 |
| 2003/0131880 A1 | 7/2003 | Marubayashi et al. |

FOREIGN PATENT DOCUMENTS

| | | |
|---|---|---|
| EP | 1 321 993 A2 | 6/2003 |
| JP | 63-167669 | 11/1988 |
| JP | 9139196 A | 5/1997 |
| JP | 10-144277 A | 5/1998 |
| JP | 10-261391 | 9/1998 |
| JP | 10-261391 A | 9/1998 |
| JP | 2000-348700 * | 12/2000 |
| JP | 3222418 | 8/2001 |
| JP | 2001-325934 | 11/2001 |
| JP | 2002-075314 A | 3/2002 |
| JP | 2002-367583 A | 12/2002 |
| JP | 2003187774 A | 7/2003 |

OTHER PUBLICATIONS

European Search Report dated Oct. 24, 2008, issued in corresponding European Patent Application No. 04 25 6667.

Japanese Office Action dated Oct. 28, 2008, issued in corresponding Japanese Patent Application No. 2003-373604.

* cited by examiner (a)

(b)

(a)

(b) enlarged view (c)

ized sealing plate portion which is part of the sealing plate and which is formed in a shape of a dome, and a break groove which is formed in the domelized sealing plate portion so as to initiate breaking of the valve structure.

SEALED CELL HAVING NON-RESEALABLE SAFETY VALVE

BACKGROUND OF THE INVENTION

1) Field of the Invention

The present invention relates to sealed cells having non-resealable safety valves.

2) Description of the Related Art

In recent years, there has been a rapid reduction in the size and weight of mobile information terminals such as mobile telephones, notebook personal computers, and PDAs (Personal Digital Assistants). Higher capacity and higher energy density are required of cells and batteries serving as the driving power sources of such terminals. Non-aqueous electrolyte secondary cells such as lithium ion secondary cells have high energy density and high capacity, and as such are widely used as the driving power sources for the terminals. Especially popular among these are square or rectangular lithium ion secondary cells for their easy mountability in the devices.

When the lithium ion secondary cells, such as lithium ion secondary cells, are exposed to atmospheres of high temperature or unusually charged and/or discharged, the electrodes and the electrolytic solution react to each other and thus the electrolytic solution are decomposed, resulting in gas generation. When the gas increases the pressure inside the cell (or internal pressure) to or over a given level, there is the risk of cell burst. In view of this, cells are provided with safety mechanisms to release the gas outside the cells as soon as the internal pressure reaches or exceeds a given level. Such safety mechanisms need to be simple in structure and should not add to the weight of the cells. The techniques proposed to meet such demands include one of providing in the sealing plate a non-resealable safety valve (valve structure) that upon increase of the internal pressure, is broken or burst to form a break opened orifice. Such a technique is disclosed in the following Patent Documents 1 to 4.

Patent Document 1: Japanese Unexamined Application Publication No. 63-167669
Patent Document 2: Japanese Patent Publication No. 3222418
Patent Document 3: Japanese Unexamined Application Publication No. 2001-325934
Patent Document 4: Japanese Unexamined Application Publication No. 10-261391 i) Patent Document 1 discloses the formation of, in part of a terminal plate, a thin portion formed by sectionally-wedge-shaped and coaxial-circular grooves wherein the circles have different diameters and the grooves are alternately provided on the inner and outer surfaces of the thin portion, so that the tops of the neighboring wedges are opposite. Such a thin portion is broken so as to permit the gas inside the cell (or internal gas) and solved substances to be externally released prior to the burst of the cell itself. Enabling to smoothly release the internal gas and solved substances to ambient atmosphere in this manner, this document claims to add to the safety of cells. With this disclosure, however, the stress relative to the internal pressure cannot be sufficiently concentrated on the sectionally-wedge-shaped grooves, which often causes variances in the values of pressure at which the thin portion is broken. Furthermore, the provision of the sectionally-wedge-shaped grooves renders the cell less resistant to impacts; the circular grooves can be easily damaged by the impacts of, for example, dropping, resulting in solution leakage. Thus, this disclosure can be problematic.

ii) Patent Document 2 discloses a sealing plate for sealing an opening portion of the container of a sealed cell. The sealing plate is constructed of a metallic plate and has a groove that is formed in the surface of the sealing plate along a contour surrounding a predetermined area. A swelling part that swells outward is formed within and continuously with the groove. The groove of the sealing plate is ruptured when pressure within the container becomes excessive and the pressure concentrated on the swelling part exceeds a predetermined level. This opens the swelling part and realizes communication with the outside. Although this document claims to add to the safety of cells with this disclosure, the groove and valve are still vulnerable to impacts and hence cracks are easy to occur, resulting in solution leakage. Thus, this document can also be problematic.

iii) Patent Document 3 discloses a thin-valve structure formed in a sealing plate for sealing a cell. The thin-valve structure is ruptured when the internal pressure reaches or exceeds a predetermined value and thus permits the internal gas to be externally released. The thin-valve structure has a dome-shaped dome and a break groove for facilitating the rupture of the thin-valve structure. The break groove is formed at the periphery of the dome, and a portion of the break groove is located in the middle of the thin-valve structure or near the middle of the thin-valve structure. Such a cell safety valve ensures a sufficient open area during the operation of the safety valve while reducing variances in the operating pressure of the safety valve. Furthermore, the leakage of the electrolytic solution is prevented. However, further improvement is desired in respect of the impact resistance of the break groove.

iv) Patent Document 4 discloses a V-shaped groove for preventing a cell from being ruptured. The V-shaped groove is located on an inner surface of a battery lid. According to this document, when the internal pressure exceeds a predetermined level, the pressure is released immediately. With this disclosure, however, the stress relative to the internal pressure still cannot be sufficiently concentrated on the V-shaped groove, causing variances in the values of pressure at which the safety mechanism is activated. Furthermore, the groove can be broken by the impacts of, for example, dropping, causing solution leakage. Again, this document can be problematic.

SUMMARY OF THE INVENTION

In view of the foregoing and other problems, it is an object of the present invention to provide a reliable sealed cell having a non-resealable safety valve that forms a break-opened orifice with an open area sufficiently wide enough to permit the gas inside the sealed cell to be released outside the sealed cell as soon as the pressure inside the sealed cell reaches or exceeds a predetermined level, and that is not unnecessarily opened by external impacts.

In order to accomplish the above and other objects, the present invention is configured as follows.

According to a first aspect of the present invention, there is provided a sealed cell having a non-resealable safety valve, the sealed cell comprising: a cell can having an opening; an electrode body having a positive electrode, a negative electrode, and a separator for separating the positive electrode and the negative electrode, the electrode body housed in the cell can; an electrolytic solution housed in the cell can; and a sealing plate for sealing the opening of the cell can, the sealed cell wherein: the sealing plate has a valve structure serving as the safety valve, the valve structure broken as soon as pressure inside the sealed cell reaches or exceeds a predetermined value so as to permit a gas inside the sealed cell to be released outside the sealed cell; and the valve structure has a dome-protruding toward an interior of the sealed cell, the dome having at a periphery thereof a break groove for facilitating the breakage of the valve structure.

According to a second aspect of the present invention, in the sealed cell of the first aspect, the break groove of the valve structure may be located on an inner surface of the sealing plate.

According to a third aspect of the present invention, in the sealed cell of the first aspect, the valve structure may be located entirely between an imaginary surface having the same plane as an outer surface of the sealing plate and another imaginary surface having the same plane as an inner surface of the sealing plate.

According to a fourth aspect of the present invention, in the sealed cell of one of the first to third aspects, the valve structure may be integral with the sealing plate.

According to a fifth aspect of the present invention, in the sealed cell of one of the first to fourth aspects, the thickness of the valve structure at the break groove may be 15 µm to 80 µm.

The present invention configured as above provides the following advantageous effects.

When pressure is applied from within the cell to the sealing plate, the deformational stress relative to the internal pressure is concentrated on the periphery of the dome. The stress is more potent with a dome protruding toward the interior of the cell than toward the exterior thereof. According to a structure of the present invention, the dome protrudes toward the interior of the cell and a break groove is formed at the periphery of the dome, as described above, and hence a strong shearing force is applied to the break groove. This renders the operating pressure and the breakage of the break groove closely related, reliably breaking the break groove as soon as the operating pressure reaches or exceeds a predetermined value. The close relationship between the operating pressure and the break groove enables a thicker valve structure at the break groove than a conventional valve for the same operating pressure. A thick valve structure at the break groove minimizes a reduction in the impact resistance resulting from the formation of the break groove. Thus, the present invention realizes a sealed cell having a non-resealable safety valve that maintains cell safety and such a break groove that is hard to be damaged by the impacts of, for example, dropping.

The location of the valve structure entirely between an imaginary surface having the same plane as the outer surface of the sealing plate and another imaginary surface having the same plane as the inner surface of the sealing plate precludes the direct contact of the valve structure and jigs; the valve structure is prevented from being damaged during cell assembly. This enhances the reliability of the sealed cell having a non-resealable safety valve.

The thickness of the valve structure at the break groove is preferably 15 µm to 80 µm, within which range safety associated with the internal pressure is enhanced while maintaining the impact resistance. If the thickness is less than 15 µm, solution leakage becomes easy to occur. If the thickness is more than 80 µm, the operating pressure of the break groove becomes excessive, posing the risk of cell burst prior to the breakage of the break groove.

DESCRIPTION OF THE PREFERRED EMBODIMENTS

Figure 1:
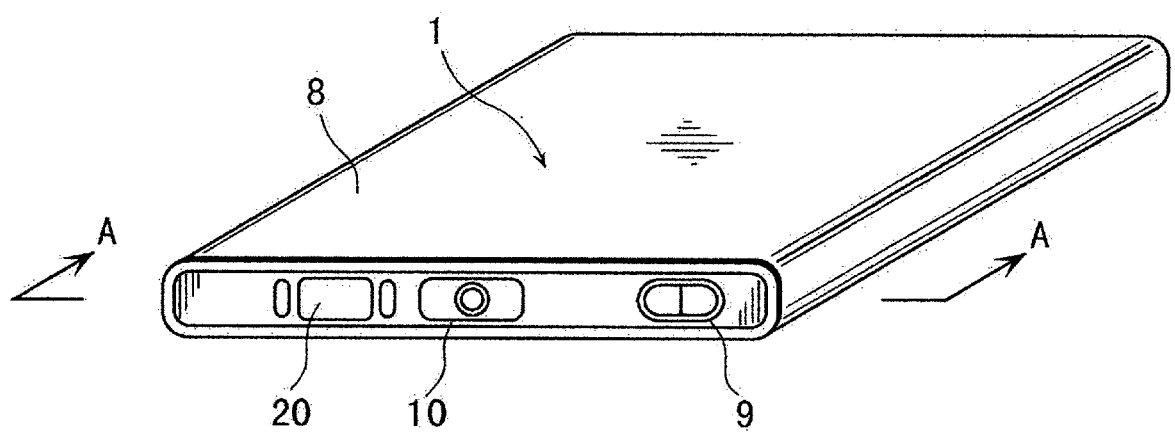
FIG. 1 is a perspective view of a cell according to an example of the present invention.

Preferred embodiments of the present invention will be described with reference to FIGS. 1, 2(a), and 2(b). FIG. 1 is a perspective view of a cell according to an example of the present invention. FIG. 2(a) is a sectional view of the cell shown in FIG. 1 taken along the line A-A, and FIG. 2(b) is an enlarged view of the valve structure 9 shown in FIG. 2(a).

A sealed cell having a non-resealable safety valve according to an example of the present invention has an outer casing can 8 that is rectangular cylindrical-shaped and has a bottom. Housed in the outer casing can 8 is an electrode body 7 of a flatly wound shape composed of a positive electrode, a negative electrode, and a separator for separating the positive and negative electrodes. Injected in the outer casing can 8 is an electrolytic solution. The opening of the outer casing can 8 is sealed by a sealing plate 6 (1 mm thick) by means of laser welding, so that the cell is sealed. The sealing plate 6 is made of an aluminum alloy.

The sealing plate 6, along with a gasket 11 and an insulation plate 12, is sandwiched between a conductive plate 14 and a negative electrode terminal 10. A negative electrode tab 15 extended from the negative electrode is electrically connected to the negative electrode terminal 10 through the conductive plate 14. The positive electrode is electrically connected to the outer casing can 8 through a positive electrode tab (not shown). The sealing plate 6 has an injection orifice 16 through which to inject an electrolytic solution. The injection orifice 16 is sealed by an injection orifice sealing member 20 after injection of the electrolytic solution.

Further, the sealing plate 6 has the valve structure 9 that is thinner than a main body 6C of the sealing plate 6 and that is formed integrally with the main body 6C. The valve structure 9 has domes 2 protruding toward the interior of the cell and break grooves 4 formed at the peripheries of the domes 2. The valve structure 9 is located entirely between an imaginary surface 18a having the same plane as an outer surface 6a of the sealing plate 6 and another imaginary surface 18b having the same plane as an inner surface 6b of the sealing plate 6.

The insulation plate 12 has formed therein an open orifice 17 at the place corresponding to the break-opened orifice of the valve structure 9. Upon generation of gas inside the cell, the internal pressure is applied to the valve structure 9 through the open orifice 17. When the internal pressure reaches or exceeds a predetermined value, the valve structure 9 is broken so as to form the break-opened orifice. The formation of the break-opened orifice results in a passageway penetrating through the open orifice 17 and the break-opened orifice. Through the passageway the interior of the cell comes in contact with ambient atmosphere and thus the internal gas is released. In such a safety mechanism, when the pressure of the gas is applied from within the cell to the domes 2 protruding toward the interior of the cell (FIG. 2(b)), the stress is concentrated on the peripheries of the domes 2. These places of concentration of stress are where the break grooves 4 are formed, and hence the domes 2 are broken along the break grooves 4, so that the break-opened orifice is formed. With such a valve structure, an open orifice of a large area is reliably formed as soon as the internal pressure reaches or exceeds a predetermined value, and thus the gas inside the cell is released immediately. This eliminates the risk of cell explosion.

In the cell shown in FIG. 1, the valve structure 9 and the open orifice 17 make up main constituents of the safety mechanism.

Example 1

An active material slurry was obtained by mixing 90 parts by mass of a positive electrode active material made of $LiCoO_2$, 5 parts by mass of a conductivity enhancer made of carbon black, 5 parts by mass of a binder made of polyvinylidene fluoride, and a solvent made of N-methyl-2-pyrrolidone (NMP). This slurry was applied on both surfaces of a positive current collector made of an aluminum foil, and the solvent was dried. The resulting electrode plate was then rolled with a roller to a predetermined thickness and cut to a predetermined width and length. Further, a positive current collector tab made of an aluminum alloy was welded to the electrode plate.

Concurrently with the above step, an negative electrode active material slurry was prepared by mixing 95 parts by mass of a negative electrode active material made of powdered graphite, 5 parts by mass of a binder made of polyvinylidene fluoride, and a solvent made of N-methyl-2-pyrrolidone (NMP). This slurry was applied on both surfaces of a negative current collector made of a copper foil, and the solvent was dried. The resulting electrode plate was then rolled with a roller to a predetermined thickness and cut to a predetermined width and length. Further, a negative current collector tab made of nickel was attached by pressure to the electrode plate.

Next, the positive electrode and the negative electrode were wound through the intermediary of a separator made of a finely porous film of polyethylene, thus preparing the electrode body 7 of a flatly wound shape. The electrode body 7 was then inserted into the outer casing can 8.

Figure 2:
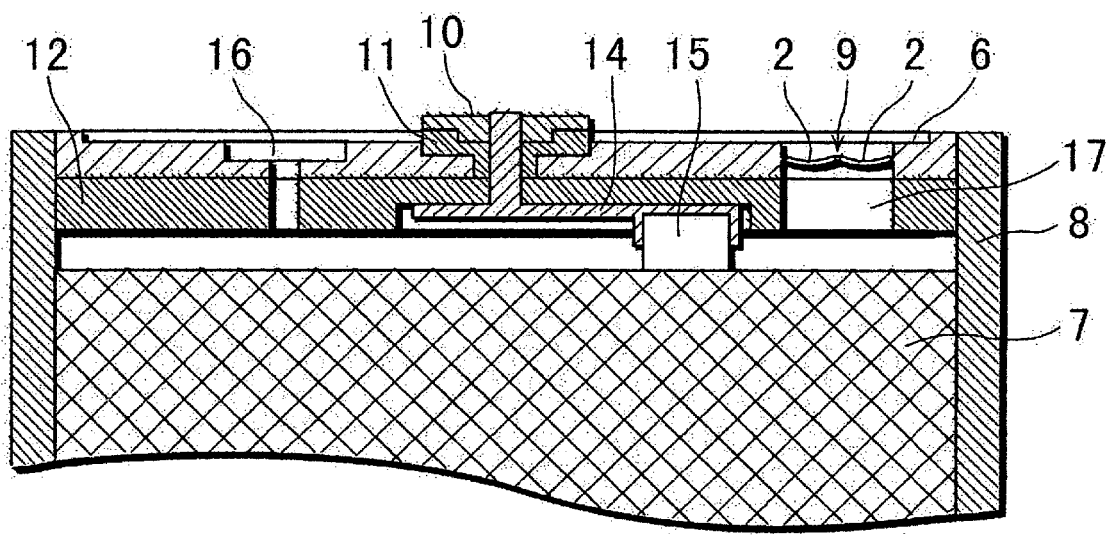
FIG. 2(a) is a sectional view of the cell shown in FIG. 1 taken along the line A-A.
FIG. 2(b) is an enlarged view of a valve structure 9 shown in FIG. 2(a).
Figure 2:
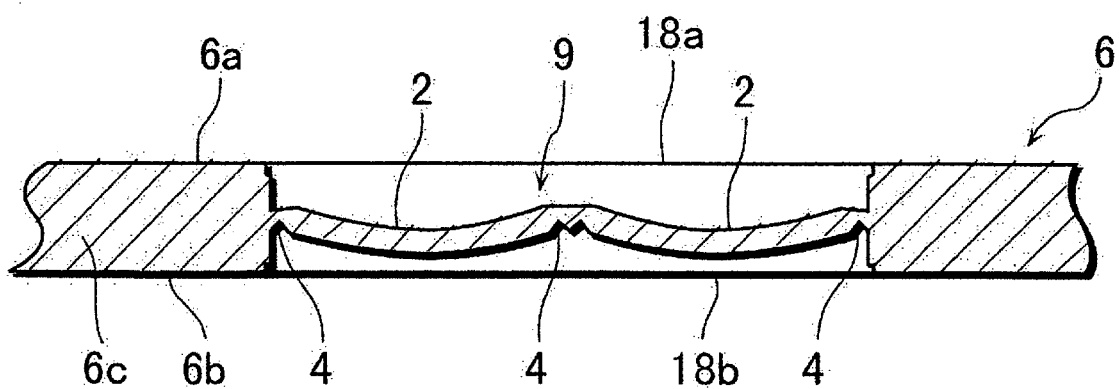

Concurrently with the above step, a thin-sheet portion was formed in a predetermined position of the sealing plate 6 by forging (a type of plasticity working) and then subjected to coining (another type of plasticity working) to form the break grooves 4 and the domes 2. Thus, the valve structure 9 formed integrally with the sealing plate 6 was prepared (FIG. 2). Subsequently, the sealing plate 6, the gasket 11, and the insulation plate 12 were sandwiched between the conductive plate 14 and the negative electrode terminal 10 in such a manner that the domes 2 would protrude toward the interior of the cell.

The outer casing can 8 was sealed by the sealing plate 6 by means of laser welding, after which the electrolytic solution was injected in the outer casing can 8, and the injection orifice 16 was sealed by the injection orifice sealing member 20. Thus, the cell according to Example 1 was prepared.

The valve structure 9 according to Example 1 has two domes 2 each having, at the periphery thereof, a break groove 4. The thickness of the valve structure 9 at each of the break grooves 4 is 30 µm. The valve structure 9 is located entirely between the imaginary surfaces having the same plane as the outer and inner surfaces of the main body 6C of the sealing plate 6.

Example 2

A cell according to Example 2 was prepared in the same manner as that in Example 1 except that the thickness of the valve structure 9 at each of the break grooves 4 was made 45 µm.

Comparative Example

Figure 8:
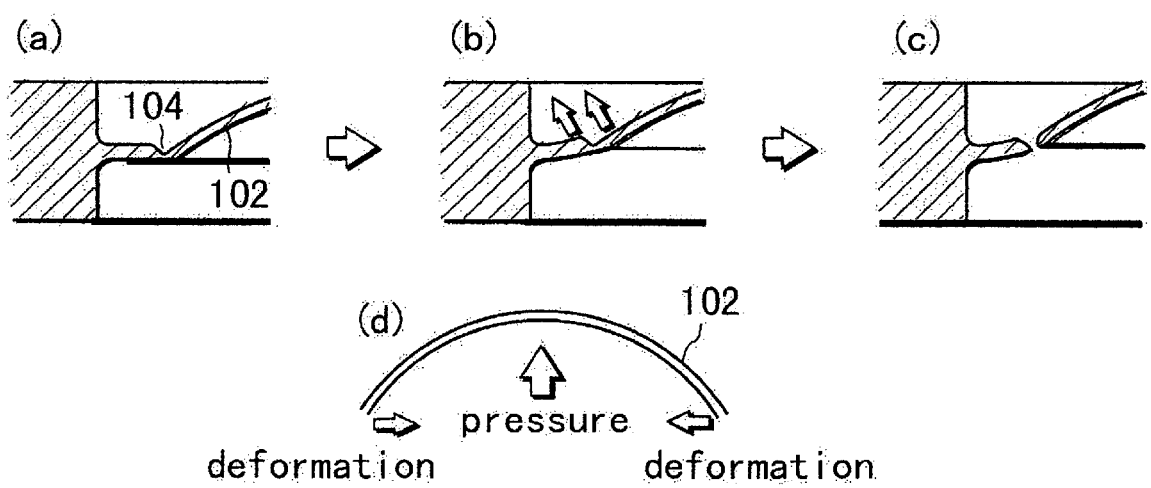
FIGS. 8(a) to (d) shows the motions of a valve structure at the time of increased internal pressure, in a cell according to a comparative example.

Referring to FIG. 8, a cell according to Comparative Example was prepared in the same manner as that in Example 1 except that domes 102 protruded toward the exterior of the cell and break grooves 104 were formed on the outer surface of the valve structure.

Operating Pressure Test

Pressure was directly applied to the valve structures of Examples 1, 2, and Comparative Example to measure the pressure (operating pressure of the break grooves) at which the break grooves were break-opened. The results are listed in Table 1. The number of sample cells of the Examples 1 and 2 and Comparative Example was 20 each.

TABLE 1

|  | Example 1 | Example 2 | Comparative Example |
|---|---|---|---|
| Groove Formation Dome Direction | Inner surface of valve structure Interior of cell | | Outer surface of valve structure Exterior of cell |
| Thickness (µm) | 30 | 45 | 30 |
| Operating Pressure (MPa) | 1.73 (average) 1.66 to 1.82 | 2.42 (average) 2.32 to 2.55 | 2.41 (average) 2.30 to 2.48 |

Table 1 shows that the operating pressure of the valve structures of the cells of Example 1 is 1.73 MPa on average, which is approximately 0.7 MPa smaller than the average operating pressure 2.41 MPa for the valve structures of the cells of Comparative Example, which had the same thickness of the valve structures at the break grooves as those of Example 1. Also, Table 1 shows that the valve structures of the cells of Example 2, each having a thickness of 45 µm at the break grooves, and the valve structures of the cells of Comparative Example, each having a thickness of 30 µm at the break grooves, had approximately the same operating pressure.

A simulation of how the stress applied to the valve structure is distributed shows that the stress is more likely to be concentrated on the break grooves in the cells of Examples than in the cells of Comparative Example. This will be discussed in detail with reference to FIGS. 3(a) to 3(d) and 8(a) to 8(d). FIGS. 3(a) to 3(d) illustrate the motions of one of the valve structures of Examples 1 and 2, and FIGS. 8(a) to 8(d) illustrate the motions of one of the valve structures of Comparative Example. In Comparative Example, when the internal pressure is applied from within the cell to the domes 102 protruding toward the exterior of the cell, the stress relative to the internal pressure is concentrated on the domes 102. That is, the internal pressure has a force of thrusting the domes 102 for further upward protrusion, as illustrated in FIG. 8(*d*) (in which the arrow directed upward represents this force). The force of thrusting the domes 102 upward causes a deformational force of contracting the areas of the peripheries of the domes 102 (this force being shown as the arrows directed to the left and right in FIG. 8(*d*)). Since the valve structure, with which the domes 102 are integral, is also thrust upward by the internal pressure, the directions of the stresses relative to the forces of thrusting the domes 102 and the valve structure are the same, as illustrated in FIG. 8(*b*). This hinders the concentration of the stress on the peripheries of the domes 102, thereby necessitating a larger pressure to break the break grooves 104.

Figure 3:
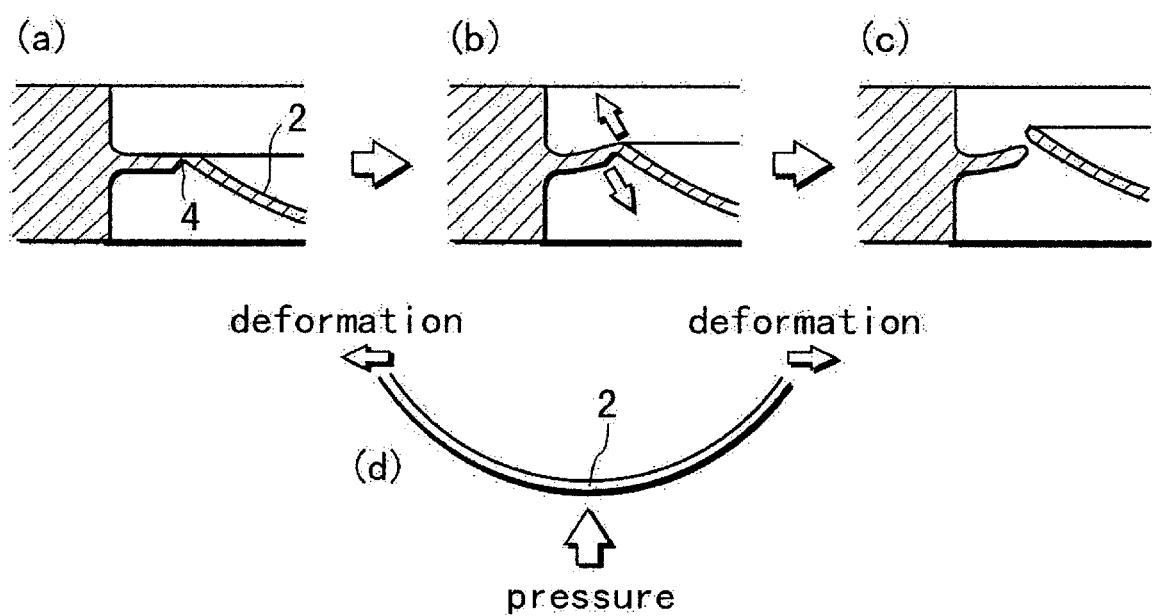
FIGS. 3(a) to 3(d) shows the motions of the valve structure 9 at the time of increased internal pressure, in a cell according to an example of the present invention.

In Example 1, when the internal pressure is applied from within the cell to the domes 2 protruding toward the interior of the cell, the internal pressure has a force of thrusting the domes 2 not only in an upward direction (in FIG. 3(*d*) the arrow directed upward represents this force) but also in a laterally outward direction. The force of thrusting the domes 2 in a laterally outward direction and the internal pressure deform the surrounding areas of the break grooves 4, which are integral with the main body 6C of the sealing plate 6, toward the exterior of the cell. While in Comparative Example this deformation was only due to the internal pressure, in Example 1 there was added the force of thrusting the domes 2 in a laterally outward direction, making it impossible for the surrounding areas of the break grooves 4 to resist the combined deformational forces. The inside areas of the break grooves 4 (i.e., the domes 2) continue with the deformation, while the surrounding areas of the break grooves 4, unable to resist the combined deformational forces, cannot. Thus, the stresses generated in the valve structure are oppositely directed, as illustrated in FIG. 3(*b*), and are concentrated on the peripheries of the domes 2, generating a strong shearing force applied to the break grooves 4, which are provided at the peripheries of the domes 2 (FIG. 3(*c*)). This requires for the cells of Example 1 a smaller internal pressure to break the break grooves 4 than the pressure with which to do so with the cells of Comparative Example, the valve structure of which had the same thickness at the break grooves as that of the cells of Example 1. In other words, a comparison of the cells of Example 2 and Comparative Example indicates that it is possible to have a thicker valve structure at the break grooves 4 for the same operating pressure.

Variances in the operating pressure to break the break grooves 4 were as small as 0.16 MPa (1.82−1.66=0.16) in the cells of Example 1, 0.23 MPa (2.55−2.32=0.23) in Example 2, and 0.18 MPa (2.48−2.30=0.18) in the cells of Comparative Example. This is considered to be attributed to the formation of the domes, which causes the internal pressure to be concentrated on the domes.

A dropping test was conducted on the cells of Example 2 and the cells of Comparative Example, which had approximately the same operating pressure. A comparison was then made on impact resistance performance.

Dropping Test

Ten cells of Example 2 and ten cells of Comparative Example were dropped from a predetermined height to a base. Each cell was dropped six times each having the front surface, back surface, right side surface, left side surface, top surface, and bottom surface of each cell faced downward. These six times of dropping were assumed 1 cycle, and the number of cycles occurred before there was solution leakage at the valve structure was visually inspected. The results are listed in Table 2. The number of sample cells of the Examples 2 and Comparative Example was 10 each.

TABLE 2

|  | Example 2 | Comparative Example |
|---|---|---|
| Groove Formation Dome Direction | Inner surface of valve structure Interior of cell | Outer surface of valve structure Exterior of cell |
| Number of cycles | 37.3 (average) 32 to 41 | 24.1 (average) 20 to 31 |

Table 2 shows that the number of cycles for the cells of Example 2 was 37.3 on average (32 to 41), which was more than 13 cycles as many as 24.1 average cycles (20 to 31) for the cells of Comparative Example.

Figure 4:
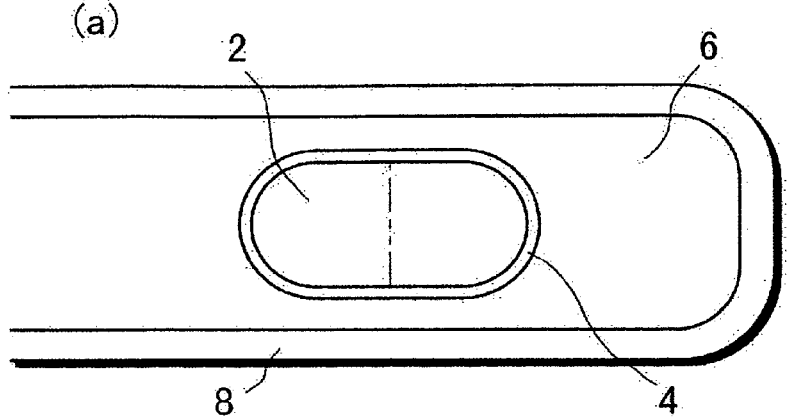
FIGS. 4(a) to 4(c) are views of a cell according to an example of the present invention illustrating the cell dropped with the negative terminal faced downward.
Figure 4:
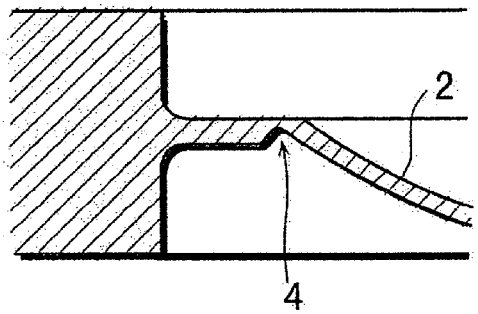
Figure 4:
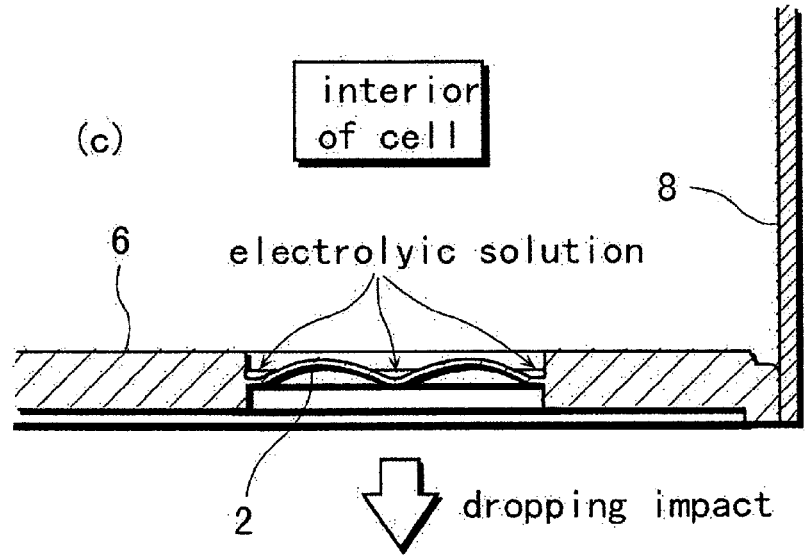
Figure 9:
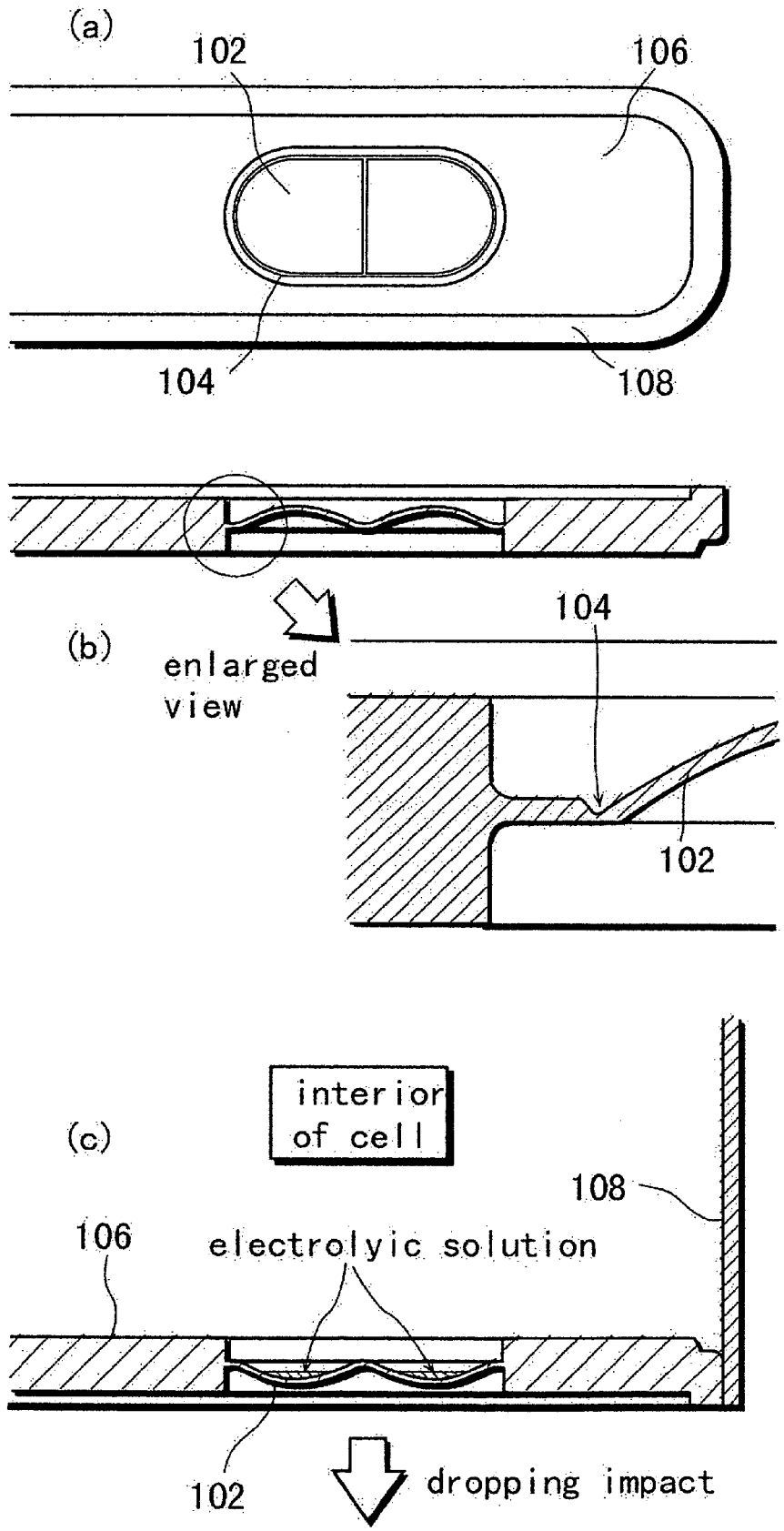
FIGS. 9(a) to 9(c) are views of a cell according to a comparative example illustrating the cell dropped with the negative terminal faced downward.

The thickness of the valve structure 9 at the break grooves 4 of the cells of Example 2 was 45 μm, which was larger than 30 μm for the valve structure at the break grooves of the cells of Comparative Example. This difference in thickness is considered to have made the superior impact resistance performance of the cells of Example 2 to that of the cells of Comparative Example. Additionally, when the cells of Comparative Example, the domes of which protruded toward the exterior of the cell, were dropped with the top surface of each cell faced downward (i.e., with the surface having the sealing plate faced downward), some amounts of an excessive electrolytic solution that was not retained by, for example, active materials accumulated in the domes, as shown in FIG. 9(*c*). It is speculated that the amounts of the accumulated electrolytic solution added to the impacts applied on the break grooves at the time of dropping. In contrast, the domes of the cells of Examples 1 and 2 protruded toward the interior of the cell, and hence even though the cells were dropped with the top surface of each cell faced downward, the accumulation of the electrolytic solution at the peripheries of the domes 2 was only in trace amounts, as shown in FIG. 4(*c*). These amounts are considered to have had little contribution to the increase of the impacts to break the break grooves 4.

Thus, there is a difference between the mechanism by which external impacts break the break grooves 4 and that by which increased internal pressure breaks the break grooves 4. It therefore has been confirmed that, even when the operating pressure is the same as a conventional value, the impact resistance performance is improved by thickening the valve structure at the break grooves and by providing domes protruding toward the interior of the cell.

Supplementary Remarks

Figure 5:
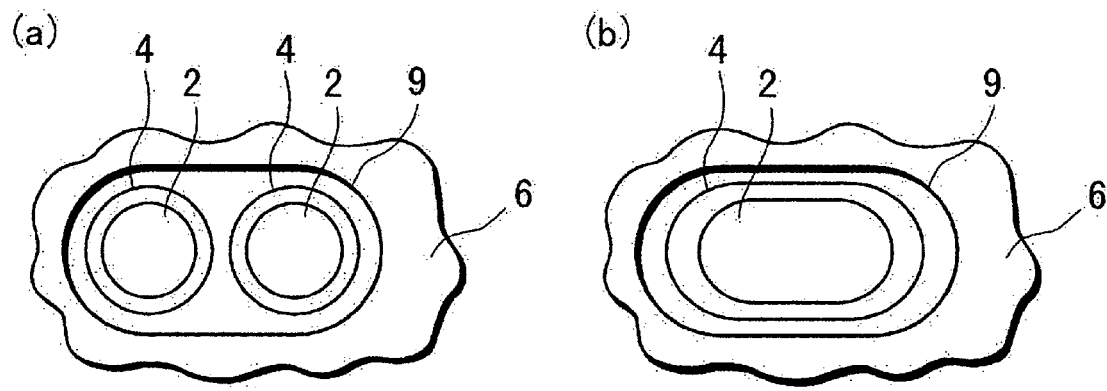
FIGS. 5(a) to 5(e) are partly enlarged views of modified examples of the valve structure 9 according to the present invention.
Figure 5:
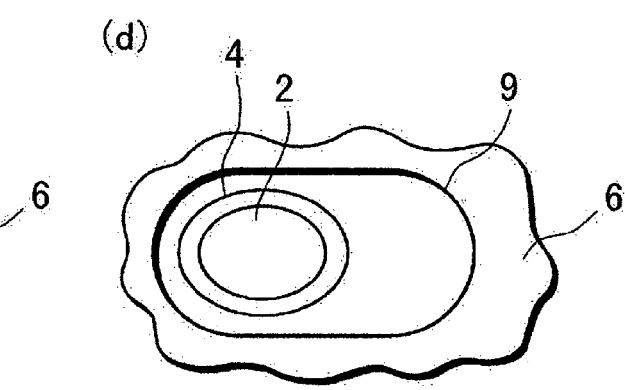
Figure 5:
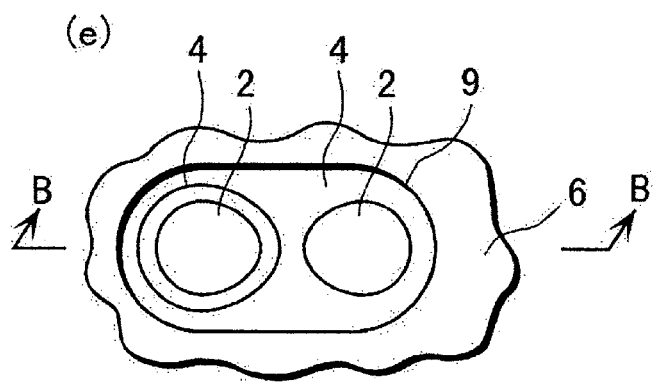
Figure 6:
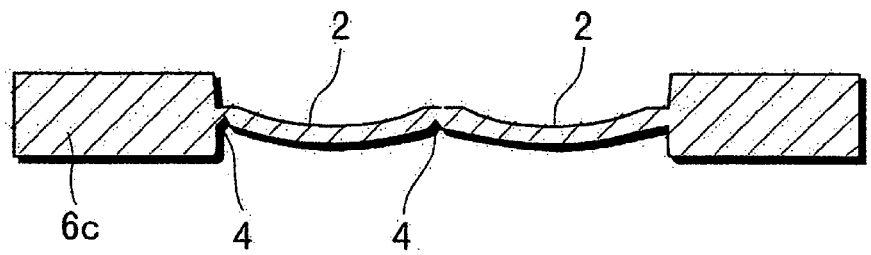
FIG. 6 is a sectional view of FIG. 5(e) taken along the line B-B.
Figure 7:
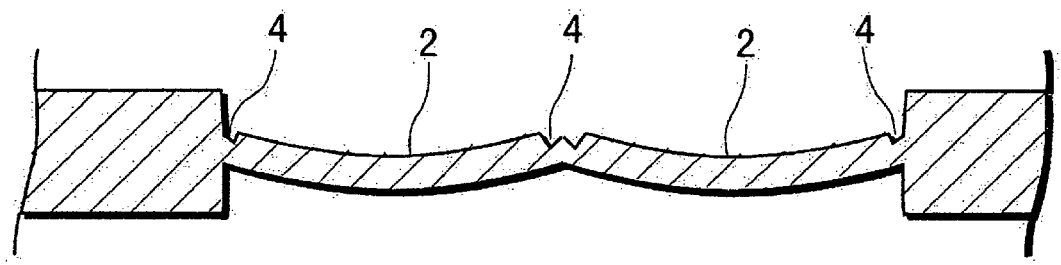
FIG. 7 is a sectional view of a break groove according to an example of the present invention showing the break groove formed on the outer surface of the valve structure 9.

While in Examples above the plan view of the valve structure 9 was elliptical and the number of the domes was 2, which also had elliptical plan views, these conditions are not to be restrictive. It will be appreciated that the plan views of the domes can be elliptical, polygonal, circular, or indefinite, as shown in FIGS. 5(*a*) to 5(*e*). Considering stress concentration and easy breakability, however, the domes preferably have plan views that are elliptical or egg-shaped having curved lines (circular shapes excluded).

The number of the domes can be one, or two or more. When the valve structure has two domes, at least one of them needs to have one break groove formed at the periphery of the one dome (FIGS. 5(*e*) and 6). One break groove provided at the periphery of at least the one dome suffices in breakage of the valve structure, thereby realizing the advantageous effects of the present invention.

The break grooves can be formed on the outer surface of the valve structure, or on both inner and outer surfaces of the valve structure.

The thickness of the valve structure is, considering easy breakability and prevention of unnecessary breakage, preferably in the range of 1% to 20% of the thickness of the sealing plate, specifically 40 μm to 100 μm.

A thickness of 15 μm or less for the valve structure at the break grooves can render the impact resistance performance insufficient, and hence the thickness is preferably 30 μm or more to improve the impact resistance performance. On the other hand, a thickness of 80 μm or more is not preferred in that the pressure required for breakage becomes excessive, posing the risk of cell burst prior to the breakage of the break grooves.

For the sealing plate 6 and valve structure 9, various materials can be used including iron, stainless steel, and pure aluminum. Preferred among these are pure aluminum and an aluminum alloy, which are light-weight and improve the weight energy density of the cell.

The present invention can be applied not only to the non-aqueous electrolyte secondary cell but also to the non-aqueous electrolyte primary cell and other cells than non-aqueous electrolyte cells. When applying the present invention to the non-aqueous electrolyte secondary cell, the positive electrode material, which was $LiCoO_2$ in Examples above, can be made of $LiNiO_2$, $LiMn_2O_4$, or $LiFeO_2$, or a mixture of the foregoing. Also contemplated is a compound in which another element is contained in the lattice crystal of any of the above compounds. The negative electrode material, which was a carbon material in Examples above, can be made of lithium, a lithium alloy, or a metal oxide (e.g., stannous oxide) capable of reversibly intercalating and deintercalating lithium ions, or a mixture of the foregoing.

The solvent for the electrolytic solution is not limited to the one used in Examples above; for example, the solvent can be made of cyclic carobonates such as propylene carbonate, ethylene carbonate, butylene carbonate, and vinylene carbonate; lactones such as γ-butyrolactone and γ-valerolactone; open-chained carbonates such as diethyl carbonate, dimethyl carbonate, and methyl ethyl carbonate; or ethers such as tetrahydrofuran, 1, 2-dimethoxyethane, diethylene glycol dimethyl ether, 1,3-dioxolane, 2-methoxy tetrahydrofuran, and diethylether. These can be used alone or in combination. The electrolyte for the electrolytic solution, which was $LiPF_6$ in Examples above, can be made of $LiAsF_6$, $LiClO_4$, $LiBF_4$, $LiCF_3SO_3$, $LiN(CF_3SO_2)_2$, or the like.

What is claimed is:

1. A sealed cell having a non-resealable safety valve structure, the sealed cell comprising:
    a cell can having an opening;
    an electrode body having a positive electrode, a negative electrode, and a separator for separating the positive electrode and the negative electrode, the electrode body housed in the cell can;
    an electrolytic solution housed in the cell can; and
    a sealing plate for sealing the opening of the cell can, the sealed cell wherein:
    the sealing plate has a valve structure that is thinner than a main body of the sealing plate serving as the safety valve, the valve structure broken as soon as pressure inside the sealed cell reaches or exceeds a predetermined value so as to permit a gas inside the sealed cell to be released outside the sealed cell; and
    the valve structure has a dome protruding toward an interior of the sealed cell, the dome having at a periphery thereof a break groove located on a surface of the sealing plate facing the interior of the sealed cell for facilitating the breakage of the valve structure.

2. The sealed cell according to claim 1, wherein the valve structure is located entirely between an imaginary surface having the same plane as an outer surface of the sealing plate and another imaginary surface having the same plane as an inner surface of the sealing plate.

3. The sealed cell according to claim 1, wherein the valve structure is integral with the sealing plate.

4. The sealed cell according to claim 1, wherein the thickness of the valve structure at the break groove is 15 μm to 80 μm.

5. The sealed cell according to claim 2, wherein the thickness of the valve structure at the break groove is 15 μm to 80 μm.

6. The sealed cell according to claim 2, wherein:
    the valve structure is integral with the sealing plate; and
    the thickness of the valve structure at the break groove is 15 μm to 80 μm.

* * * * *